9858X
W. Woolley.
Window.
Patented Jul. 1, 1836.
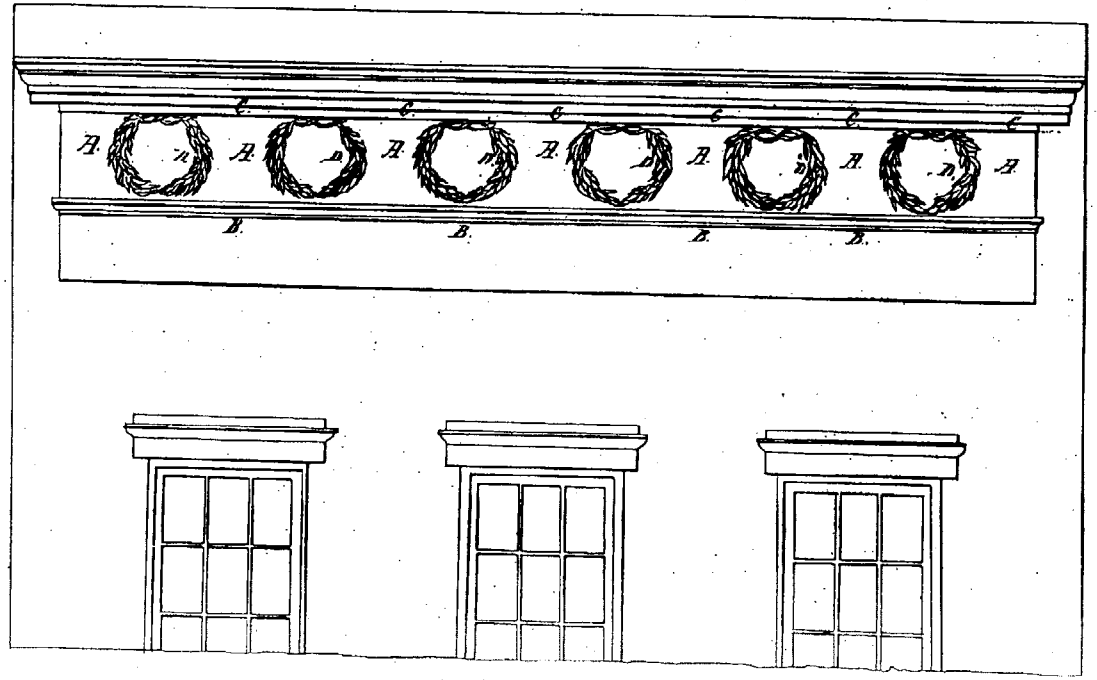
THE GRAPHIC CO. PHOTO-LITH. 39 & 41 PARK PLACE, N.Y.

9858

July 1, 1836

1.

William Woolley.
Letters Patent (Issued July 1. 1836.)

The Schedule referred to in these Letters Patent, and ma-
king part of the same, containing a description in the words
[illegible] the said William Woolley himself of his Improvement
in the Frieze Window and Covering.

---

The undersigned William Woolley has heretofore obtain-
ed Letters Patent of the United States for his Improvement in
the construction of a Frieze Window and Covering bearing
date the thirteenth day of August, in the year one thous-
and eight hundred and thirty-three, and has since made
a further Improvement upon the same, of which the following is a
Specification, in the words of the said William Woolley himself.
The Frieze in which the windows are made, is formed of
cast iron plates, of convenient length for casting, that is to say,
three feet or more, about one fourth of an inch thick, and of
the width required by the size of the window, or the style of the
building. Upon these plates is cast a part of the casement of the
window, when it is made of the form of a wreath, or other orna-
ment, as in the drawing. When put up, they rest in grooves cast
[illegible] other cast iron plates, which are fastened into the mason work
[illegible] the building. In these grooves are mortices, and on the frieze plates
corresponding tenons, by which the plates are firmly secured. Like
plates, with grooves and mortices, hold the frieze plates on the upper
side also. Cast iron sliding shutters are made for the windows,
which slide in grooves formed in the upper and lower plates
[illegible] before described, inside of the other grooves, and of the ~~[illegible]~~ win-
dow casements, or the shutters may turn on a pivot or hinges
By making the frieze plates to meet at top and bottom, in
the middle of the window, and by surrounding the window with
a cast iron casement in one piece, fastened by screws to each plate,
[illegible] whole piece appears to be one continued plate, and the parts are firmly kept together. Both the frieze plates and the others ma
be cast to suit any style of architecture, and to form the cornice o
the building. Thus the frieze, with windows and light shutte
together with the cornice, if desired, is made wholly of cast iro In connection with the frieze window, cast iron gutters m
be used; and the whole may be painted in imitation of marb
or other stone. In the annexed drawing the letters A, A, A, r
resent the frieze plates. The letters B, B, B, & C, C, C, the plate
above and below, at right angles with the frieze plates, with
cornice on their edges. The letters D, D, D, represent the win
casements in the form of a wreath.

(This improvement consists in the application of orname
tic frieze and shutters to the metallic frieze window & corni
heretofore Patented by me in the construction of houses and
other buildings, in the manner above described.

New York, May 7th 1836.

Witnesses
Geo. C. Goddard
John C. Goddard

William Woolley

[illegible]

(Patented July 1. 1836.)

(Revived and Recorded June 1. 1839.)

(Drawing)